July 21, 1953 — A. H. BATES, JR., ET AL — 2,645,939

SHEET MEASURING APPARATUS

Filed Aug. 11, 1950 — 5 Sheets-Sheet 1

INVENTORS

NED BOBO
CHARLES F. MULLINAX
WISTAR W. MACOMSON
ARTHUR H BATES, JR.

BY Parrott, Richards and Sims

ATTORNEYS

INVENTORS
NED BOBO
CHARLES F. MULLINAX
WISTAR W. MACOMSON
ARTHUR H. BATES, JR.
By Parrott, Richards and Sims
Attorneys

SHEET MEASURING APPARATUS

Filed Aug. 11, 1950 5 Sheets-Sheet 3

| | | | | |
|---|---|---|---|---|
| 110 | 10 5 | - 4 | 1 3 | 2 2 |
| 111 | 3 1 | 4 - | 5 11 | 6 10 |
| 112 | 7 9 | 8 8 | 9 7 | 10 6 |
| 113 | - 5 | 1 4 | 2 3 | 3 2 |
| 114 | 4 1 | 5 - | 6 11 | 7 10 |
| 115 | 8 9 | 9 8 | 10 7 | - 6 |
| 116 | 1 5 | 2 4 | 3 3 | 4 2 |
| 117 | 5 1 | 6 - | 7 11 | 8 10 |
| 118 | 9 9 | 10 8 | - 7 | 1 6 |
| 119 | 2 5 | 3 4 | 4 3 | 5 2 |
| 120 | 6 1 | 7 - | 8 11 | 9 10 |
| 121 | 10 9 | - 8 | 1 7 | 2 6 |
| 122 | 3 5 | 4 4 | 5 3 | 6 2 |
| 123 | 7 1 | 8 - | 9 11 | 10 10 |
| 124 | - 9 | 1 8 | 2 7 | 3 5 |
| 125 | 4 5 | 5 4 | 6 3 | 7 2 |
| 126 | 8 1 | 9 - | 10 11 | - 10 |
| 127 | 1 9 | 2 8 | 3 7 | 4 6 |
| 128 | 5 5 | 6 4 | 7 3 | 8 2 |
| 129 | 9 1 | 10 - | 11 | 1 10 |
| 130 | 2 9 | 3 8 | 4 7 | 5 6 |
| 131 | 6 5 | 7 4 | 8 3 | 9 2 |
| 132 | 10 1 | - - | 1 11 | 2 10 |
| 133 | 3 9 | 4 8 | 5 7 | 6 6 |
| 134 | 7 5 | 8 4 | 9 3 | 10 2 |
| 135 | - 1 | 1 - | 2 11 | 3 10 |
| 136 | 4 9 | 5 8 | 6 7 | 7 6 |
| 137 | 8 5 | 9 4 | 10 3 | - 2 |
| 138 | 1 1 | 2 - | 3 11 | 4 10 |
| 139 | 5 9 | 6 8 | 7 7 | 8 6 |
| 140 | 9 5 | 10 4 | - 3 | 1 2 |
| 141 | 2 1 | 3 - | 4 11 | 5 10 |
| 142 | 6 9 | 7 8 | 8 7 | 9 6 |
| 143 | 10 5 | - 4 | 1 3 | 2 2 |
| 144 | 3 1 | 4 - | 5 11 | 6 10 |
| 145 | 7 9 | 8 8 | 9 7 | 10 6 |
| 146 | - 5 | 1 4 | 2 3 | 3 2 |
| 147 | 4 1 | 5 - | 6 11 | 7 10 |
| 148 | 8 9 | 9 8 | 10 7 | - 6 |
| 149 | 1 5 | 2 4 | 3 3 | 4 2 |
| 150 | 5 1 | 6 - | 7 11 | 8 10 |
| 151 | 9 9 | 10 8 | - 7 | 1 6 |
| 152 | 2 5 | 3 4 | 4 3 | 5 2 |
| 153 | 6 1 | 7 - | 8 11 | 9 10 |
| 154 | 10 9 | - 8 | 1 7 | 2 6 |
| 155 | 3 5 | 4 4 | 5 3 | 6 2 |
| 156 | 7 1 | 8 - | 9 11 | 10 10 |
| 157 | - 9 | 1 8 | 2 7 | 3 6 |
| 158 | 4 5 | 5 4 | 6 3 | 7 2 |
| 159 | 8 1 | 9 - | 10 11 | - 10 |
| 160 | 1 9 | 2 8 | 3 7 | 4 6 |
| 161 | 5 5 | 6 4 | 7 3 | 8 2 |
| 162 | 9 1 | 10 - | - 11 | 1 10 |
| 163 | 2 9 | 3 8 | 4 7 | 5 6 |
| 164 | 6 5 | 7 4 | 8 3 | 9 2 |
| 165 | 10 1 | - - | 1 11 | 2 10 |
| 166 | 3 9 | 4 8 | 5 7 | 6 6 |
| 167 | 7 5 | 8 4 | 9 3 | 10 2 |
| 168 | - 1 | 1 - | 2 11 | 3 10 |
| 169 | 4 9 | 5 8 | 6 7 | 7 6 |
| 170 | 8 5 | 9 4 | 10 3 | - 2 |
| 171 | 1 1 | 2 | 3 11 | 4 10 |
| 172 | 5 9 | 6 8 | 7 7 | 8 6 |
| 173 | 9 5 | 10 4 | - 3 | 1 2 |
| 174 | 2 1 | 3 - | 4 11 | 5 10 |
| 175 | 6 9 | 7 8 | 8 7 | 9 6 |
| 176 | 10 5 | - 4 | 1 3 | 2 2 |
| 177 | 3 1 | 4 - | 5 11 | 6 10 |
| 178 | 7 9 | 8 8 | 9 7 | 10 6 |
| 179 | - 5 | 1 4 | 2 3 | 3 2 |
| 180 | 4 1 | 5 - | 6 11 | 7 10 |
| 181 | 8 9 | 9 8 | 10 7 | - 6 |
| 182 | 1 5 | 2 4 | 3 3 | 4 2 |
| 183 | 5 1 | 6 - | 7 11 | 8 10 |
| 184 | 9 9 | 10 8 | - 7 | 1 6 |
| 185 | 2 5 | 3 4 | 4 3 | 5 2 |
| 186 | 6 1 | 7 - | 8 11 | 9 10 |
| 187 | 10 9 | - 8 | 1 7 | 2 6 |
| 188 | 3 5 | 4 4 | 5 3 | 6 2 |
| 189 | 7 1 | 8 - | 9 11 | 10 10 |
| 190 | - 9 | 1 8 | 2 7 | 3 6 |
| 191 | 4 5 | 5 4 | 6 3 | 7 2 |
| 192 | 8 1 | 9 - | 10 11 | - 10 |
| 193 | 1 9 | 2 8 | 3 7 | 4 6 |
| 194 | 5 5 | 6 4 | 7 3 | 8 2 |
| 195 | 9 1 | 10 - | - 11 | 1 10 |
| 196 | 2 9 | 3 8 | 4 7 | 5 6 |
| 197 | 6 5 | 7 4 | 8 3 | 9 2 |
| 198 | 10 1 | - - | 1 11 | 2 10 |
| 199 | 3 9 | 4 8 | 5 7 | 6 6 |
| 200 | 7 5 | 8 4 | 9 3 | 10 2 |
| 201 | - 1 | 1 - | 2 11 | 3 10 |
| 202 | 4 9 | 5 8 | 6 7 | 7 6 |
| 203 | 8 5 | 9 4 | 10 3 | - 2 |
| 204 | 1 1 | 2 - | 3 11 | 4 10 |
| 205 | 5 9 | 6 8 | 7 7 | 8 6 |
| 206 | 9 5 | 10 4 | - 3 | 1 2 |
| 207 | 2 1 | 3 - | 4 11 | 5 10 |
| 208 | 6 9 | 7 8 | 8 7 | 9 6 |
| 209 | 10 5 | - - | 1 3 | 2 2 |
| 210 | 3 1 | 4 - | 5 11 | 6 10 |
| 211 | 7 9 | 8 8 | 9 7 | 10 6 |
| 212 | - 5 | 1 4 | 2 3 | 3 2 |
| 213 | 4 1 | 5 - | 6 11 | 7 10 |
| 214 | 8 9 | 9 8 | 10 7 | - 6 |
| 215 | 1 5 | 2 4 | 3 3 | 4 2 |
| 216 | 5 1 | 6 - | 7 11 | 8 10 |
| 217 | 9 9 | 10 8 | - 7 | 1 6 |
| 218 | 2 5 | 3 4 | 4 3 | 5 2 |
| 219 | 6 1 | 7 - | 8 11 | 9 10 |

Fig. 4

INVENTORS
NED BOBO
CHARLES F. MULLINAX
WISTAR W. MACOMSON
ARTHUR H. BATES, JR.
By Parrott, Richards and Sims
Attorneys

| 220 | | 230 | | 240 | | 250 | | 260 | | 270 | | 280 | | 290 | | 300 | | 310 | | 320 | |
|---|---|---|---|---|---|---|---|---|---|---|---|---|---|---|---|---|---|---|---|---|---|
| 10 | 9 | 6 | 5 | 2 | 1 | 9 | 9 | 5 | 5 | 1 | 1 | 8 | 9 | 4 | 5 | - | 1 | 7 | 9 | 3 | 5 |
| - | 8 | 7 | 4 | 3 | - | 10 | 8 | 6 | 4 | 2 | - | 9 | 8 | 5 | 4 | 1 | - | 8 | 8 | 4 | 4 |
| 1 | 7 | 8 | 3 | 4 | 11 | - | 7 | 7 | 3 | 3 | 11 | 10 | 7 | 6 | 3 | 2 | 11 | 9 | 7 | 5 | 3 |
| 2 | 6 | 9 | 2 | 5 | 10 | 1 | 6 | 8 | 2 | 4 | 10 | - | 6 | 7 | 2 | 3 | 10 | 10 | 6 | 6 | 2 |

| 221 | | 231 | | 241 | | 251 | | 261 | | 271 | | 281 | | 291 | | 301 | | 311 | | 321 | |
|---|---|---|---|---|---|---|---|---|---|---|---|---|---|---|---|---|---|---|---|---|---|
| 3 | 5 | 10 | 1 | 6 | 9 | 2 | 5 | 9 | 1 | 5 | 9 | 1 | 5 | 8 | 1 | 4 | 9 | - | 5 | 7 | 1 |
| 4 | 4 | - | - | 7 | 8 | 3 | 4 | 10 | - | 6 | 8 | 2 | 4 | 9 | - | 5 | 8 | 1 | 4 | 8 | - |
| 5 | 3 | 1 | 11 | 8 | 7 | 4 | 3 | - | 11 | 7 | 7 | 3 | 3 | 10 | 11 | 6 | 7 | 2 | 3 | 9 | 11 |
| 6 | 2 | 2 | 10 | 9 | 6 | 5 | 2 | 1 | 10 | 8 | 6 | 4 | 2 | - | 10 | 7 | 6 | 3 | 2 | 10 | 10 |

| 222 | | 232 | | 242 | | 252 | | 262 | | 272 | | 282 | | 292 | | 302 | | 312 | | 322 | |
|---|---|---|---|---|---|---|---|---|---|---|---|---|---|---|---|---|---|---|---|---|---|
| 7 | 1 | 3 | 9 | 10 | 5 | 6 | 1 | 2 | 9 | 9 | 5 | 5 | 1 | 1 | 9 | 8 | 5 | 4 | 1 | - | 9 |
| 8 | - | 4 | 8 | - | 4 | 7 | - | 3 | 8 | 10 | 4 | 6 | - | 2 | 8 | 9 | 4 | 5 | - | 1 | 8 |
| 9 | 11 | 5 | 7 | 1 | 3 | 8 | 11 | 4 | 7 | - | 3 | 7 | 11 | 3 | 7 | 10 | 3 | 6 | 11 | 2 | 7 |
| 10 | 10 | 6 | 6 | 2 | 2 | 9 | 10 | 5 | 6 | 1 | 2 | 8 | 10 | 4 | 6 | - | 2 | 7 | 10 | 3 | 6 |

| 223 | | 233 | | 243 | | 253 | | 263 | | 273 | | 283 | | 293 | | 303 | | 313 | | 323 | |
|---|---|---|---|---|---|---|---|---|---|---|---|---|---|---|---|---|---|---|---|---|---|
| - | 9 | 7 | 5 | 3 | 1 | 10 | 9 | 6 | 5 | 2 | 1 | 9 | 9 | 5 | 5 | 1 | 1 | 8 | 9 | 4 | 5 |
| 1 | 8 | 8 | 4 | 4 | - | - | 8 | 7 | 4 | 3 | - | 10 | 8 | 6 | 4 | 2 | - | 9 | 8 | 5 | 4 |
| 2 | 7 | 9 | 3 | 5 | 11 | 1 | 7 | 8 | 3 | 4 | 11 | - | 7 | 7 | 3 | 3 | 11 | 10 | 7 | 6 | 3 |
| 3 | 6 | 10 | 2 | 6 | 10 | 2 | 6 | 9 | 2 | 5 | 10 | 1 | 6 | 8 | 2 | 4 | 10 | - | 6 | 7 | 2 |

| 224 | | 234 | | 244 | | 254 | | 264 | | 274 | | 284 | | 294 | | 304 | | 314 | | 324 | |
|---|---|---|---|---|---|---|---|---|---|---|---|---|---|---|---|---|---|---|---|---|---|
| 4 | 5 | - | 1 | 7 | 9 | 3 | 5 | 10 | 1 | 6 | 9 | 2 | 5 | 9 | 1 | 5 | 9 | 1 | 5 | 8 | 1 |
| 5 | 4 | 1 | - | 8 | 8 | 4 | 4 | - | - | 7 | 8 | 3 | 4 | 10 | - | 6 | 8 | 2 | 4 | 9 | - |
| 6 | 3 | 2 | 11 | 9 | 7 | 5 | 3 | 1 | 11 | 8 | 7 | 4 | 3 | - | 11 | 7 | 7 | 3 | 3 | 10 | 11 |
| 7 | 2 | 3 | 10 | 10 | 6 | 6 | 2 | 2 | 10 | 9 | 6 | 5 | 2 | 1 | 10 | 8 | 6 | 4 | 2 | - | 10 |

| 225 | | 235 | | 245 | | 255 | | 265 | | 275 | | 285 | | 295 | | 305 | | 315 | | 325 | |
|---|---|---|---|---|---|---|---|---|---|---|---|---|---|---|---|---|---|---|---|---|---|
| 8 | 1 | 4 | 9 | - | 5 | 7 | 1 | 3 | 9 | 10 | 5 | 6 | 1 | 2 | 9 | 9 | 5 | 5 | 1 | 1 | 9 |
| 9 | - | 5 | 8 | 1 | 4 | 8 | - | 4 | 8 | - | 4 | 7 | - | 3 | 8 | 10 | 4 | 6 | - | 2 | 8 |
| 10 | 11 | 6 | 7 | 2 | 3 | 9 | 11 | 5 | 7 | 1 | 3 | 8 | 11 | 4 | 7 | - | 3 | 7 | 11 | 3 | 7 |
| - | 10 | 7 | 6 | 3 | 2 | 10 | 10 | 6 | 6 | 2 | 2 | 9 | 10 | 5 | 6 | 1 | 2 | 8 | 10 | 4 | 6 |

| 226 | | 236 | | 246 | | 256 | | 266 | | 276 | | 286 | | 296 | | 306 | | 316 | | 326 | |
|---|---|---|---|---|---|---|---|---|---|---|---|---|---|---|---|---|---|---|---|---|---|
| 1 | 9 | 8 | 5 | 4 | 1 | - | 9 | 7 | 5 | 3 | 1 | 10 | 9 | 6 | 5 | 2 | 1 | 9 | 9 | 5 | 5 |
| 2 | 8 | 9 | 4 | 5 | - | 1 | 8 | 8 | 4 | 4 | - | - | 8 | 7 | 4 | 3 | - | 10 | 8 | 6 | 4 |
| 3 | 7 | 10 | 3 | 6 | 11 | 2 | 7 | 9 | 3 | 5 | 11 | 1 | 7 | 8 | 3 | 4 | 11 | - | 7 | 7 | 3 |
| 4 | 6 | - | 2 | 7 | 10 | 3 | 6 | 10 | 2 | 6 | 10 | 2 | 6 | 9 | 2 | 5 | 10 | 1 | 6 | 8 | 2 |

| 227 | | 237 | | 247 | | 257 | | 267 | | 277 | | 287 | | 297 | | 307 | | 317 | | 327 | |
|---|---|---|---|---|---|---|---|---|---|---|---|---|---|---|---|---|---|---|---|---|---|
| 5 | 5 | 1 | 1 | 8 | 9 | 4 | 5 | - | 1 | 7 | 9 | 3 | 5 | 10 | 1 | 6 | 9 | 2 | 5 | 9 | 1 |
| 6 | 4 | 2 | - | 9 | 8 | 5 | 4 | 1 | - | 8 | 8 | 4 | 4 | - | - | 7 | 8 | 3 | 4 | 10 | - |
| 7 | 3 | 3 | 11 | 10 | 7 | 6 | 3 | 2 | 11 | 9 | 7 | 5 | 3 | 1 | 11 | 8 | 7 | 4 | 3 | - | 11 |
| 8 | 2 | 4 | 10 | - | 6 | 7 | 2 | 3 | 10 | 10 | 6 | 6 | 2 | 2 | 10 | 9 | 6 | 5 | 2 | 1 | 10 |

| 228 | | 238 | | 248 | | 258 | | 268 | | 278 | | 288 | | 298 | | 308 | | 318 | | 328 | |
|---|---|---|---|---|---|---|---|---|---|---|---|---|---|---|---|---|---|---|---|---|---|
| 9 | 1 | 5 | 9 | 1 | 5 | 8 | 1 | 4 | 9 | - | 5 | 7 | 1 | 3 | 9 | 10 | 5 | 6 | 1 | 2 | 9 |
| 10 | - | 6 | 8 | 2 | 4 | 9 | - | 5 | 8 | 1 | 4 | 8 | - | 4 | 8 | - | 4 | 7 | - | 3 | 8 |
| - | 11 | 7 | 7 | 3 | 3 | 10 | 11 | 6 | 7 | 2 | 3 | 9 | 11 | 5 | 7 | 1 | 3 | 8 | 11 | 4 | 7 |
| 1 | 10 | 8 | 6 | 4 | 2 | - | 10 | 7 | 6 | 3 | 2 | 10 | 10 | 6 | 6 | 2 | 2 | 9 | 10 | 5 | 6 |

| 229 | | 239 | | 249 | | 259 | | 269 | | 279 | | 289 | | 299 | | 309 | | 319 | | 329 | |
|---|---|---|---|---|---|---|---|---|---|---|---|---|---|---|---|---|---|---|---|---|---|
| 2 | 9 | 9 | 5 | 5 | 1 | 1 | 9 | 8 | 5 | 4 | 1 | - | 9 | 7 | 5 | 3 | 1 | 10 | 9 | 6 | 5 |
| 3 | 8 | 10 | 4 | 6 | - | 2 | 8 | 9 | 4 | 5 | - | 1 | 8 | 8 | 4 | 4 | - | - | 8 | 7 | 4 |
| 4 | 7 | - | 3 | 7 | 11 | 3 | 7 | 10 | 3 | 6 | 11 | 2 | 7 | 9 | 3 | 5 | 11 | 1 | 7 | 8 | 3 |
| 5 | 6 | 1 | 2 | 8 | 10 | 4 | 6 | - | 2 | 7 | 10 | 3 | 6 | 10 | 2 | 6 | 10 | 2 | 6 | 9 | 2 |

Fig. 5

INVENTORS
NED BOBO
CHARLES F. MULLINAX
WISTAR W. MACOMSON
ARTHUR H. BATES, JR.
By Parrott, Richards and Sims
Attorneys

| 330 | 340 | 350 | 360 | 370 | 380 | 390 | 400 |
|---|---|---|---|---|---|---|---|
| 10 1 | 6 9 | 2 5 | 9 1 | 5 9 | 1 5 | 8 1 | 4 9 |
| - - | 7 8 | 3 4 | 10 - | 6 8 | 2 4 | 9 - | 5 8 |
| 1 11 | 8 7 | 4 3 | - 11 | 7 7 | 3 3 | 10 11 | 6 7 |
| 2 10 | 9 6 | 5 2 | 1 10 | 8 6 | 4 2 | - 10 | 7 6 |

| 331 | 341 | 351 | 361 | 371 | 381 | 391 | 401 |
|---|---|---|---|---|---|---|---|
| [illegible] 9 | 10 5 | 6 1 | 2 9 | 9 5 | 5 1 | 1 9 | 8 5 |
| 4 8 | - 4 | 7 - | 3 8 | 10 4 | 6 - | 2 8 | 9 4 |
| 5 7 | 1 3 | 8 11 | 4 7 | - 3 | 7 11 | 3 7 | 10 3 |
| 6 6 | 2 2 | 9 10 | 5 6 | 1 2 | 8 10 | 4 6 | - 2 |

| 332 | 342 | 352 | 362 | 372 | 382 | 392 | 402 |
|---|---|---|---|---|---|---|---|
| 7 5 | 3 1 | 10 9 | 6 5 | 2 1 | 9 9 | 5 5 | 1 1 |
| 8 4 | 4 - | - 8 | 7 4 | 3 - | 10 8 | 6 4 | 2 - |
| 9 3 | 5 11 | 1 7 | 8 3 | 4 11 | - 7 | 7 3 | 3 11 |
| 10 2 | 6 10 | 2 6 | 9 2 | 5 10 | 1 6 | 8 2 | 4 10 |

| 333 | 343 | 353 | 363 | 373 | 383 | 393 | 403 |
|---|---|---|---|---|---|---|---|
| - 1 | 7 9 | 3 5 | 10 1 | 6 9 | 2 5 | 9 1 | 5 9 |
| 1 - | 8 8 | 4 4 | - - | 7 8 | 3 4 | 10 - | 6 8 |
| 2 11 | 9 7 | 5 3 | 1 11 | 8 7 | 4 3 | - 11 | 7 7 |
| 3 10 | 10 6 | 6 2 | 2 10 | 9 6 | 5 2 | 1 10 | 8 6 |

| 334 | 344 | 354 | 364 | 374 | 384 | 394 | 404 |
|---|---|---|---|---|---|---|---|
| 4 9 | - 5 | 7 1 | 3 9 | 10 5 | 6 1 | 2 9 | 9 5 |
| 5 8 | 1 4 | 8 - | 4 8 | - 4 | 7 - | 3 8 | 10 4 |
| 6 7 | 2 3 | 9 11 | 5 7 | 1 3 | 8 11 | 4 7 | - 3 |
| 7 6 | 3 2 | 10 10 | 6 6 | 2 2 | 9 10 | 5 6 | 1 2 |

| 335 | 345 | 355 | 365 | 375 | 385 | 395 | 405 |
|---|---|---|---|---|---|---|---|
| 8 5 | 4 1 | - 9 | 7 5 | 3 1 | 10 9 | 6 5 | 2 1 |
| 9 4 | 5 - | 1 8 | 8 4 | 4 - | - 8 | 7 4 | 3 - |
| 10 3 | 6 11 | 2 7 | 9 3 | 5 11 | 1 7 | 8 3 | 4 11 |
| - 2 | 7 10 | 3 6 | 10 2 | 6 10 | 2 6 | 9 2 | 5 10 |

| 336 | 346 | 356 | 366 | 376 | 386 | 396 | 406 |
|---|---|---|---|---|---|---|---|
| 1 1 | 8 9 | 4 5 | - 1 | 7 9 | 3 5 | 10 1 | 6 9 |
| 2 - | 9 8 | 5 4 | 1 - | 8 8 | 4 4 | - - | 7 8 |
| 3 11 | 10 7 | 6 3 | 2 11 | 9 7 | 5 3 | 1 11 | 8 7 |
| 4 10 | - 6 | 7 2 | 3 10 | 10 6 | 6 2 | 2 10 | 9 6 |

| 337 | 347 | 357 | 367 | 377 | 387 | 397 | 407 |
|---|---|---|---|---|---|---|---|
| 5 9 | 1 5 | 8 1 | 4 9 | - 5 | 7 1 | 3 9 | 10 5 |
| 6 8 | 2 4 | 9 - | 5 8 | 1 4 | 8 - | 4 8 | - 4 |
| 7 7 | 3 3 | 10 11 | 6 7 | 2 3 | 9 11 | 5 7 | 1 3 |
| 8 6 | 4 2 | - 10 | 7 6 | 3 2 | 10 10 | 6 6 | 2 2 |

| 338 | 348 | 358 | 368 | 378 | 388 | 398 | 408 |
|---|---|---|---|---|---|---|---|
| 9 5 | 5 1 | 1 9 | 8 5 | 4 1 | - 9 | 7 5 | 3 1 |
| 10 4 | 6 - | 2 8 | 9 4 | 5 - | 1 8 | 8 4 | 4 - |
| - 3 | 7 11 | 3 7 | 10 3 | 6 11 | 2 7 | 9 3 | 5 11 |
| 1 2 | 8 10 | 4 6 | - 2 | 7 10 | 3 6 | 10 2 | 6 10 |

| 339 | 349 | 359 | 369 | 379 | 389 | 399 | 409 |
|---|---|---|---|---|---|---|---|
| 2 1 | 9 9 | 5 5 | 1 1 | 8 9 | 4 5 | - 1 | 7 9 |
| 3 - | 10 8 | 6 4 | 2 - | 9 8 | 5 4 | 1 - | 8 8 |
| 4 11 | - 7 | 7 3 | 3 11 | 10 7 | 6 3 | 2 11 | 9 7 |
| 5 10 | 1 6 | 8 2 | 4 10 | - 6 | 7 2 | 3 10 | 10 6 |

Fig. 6

INVENTORS
NED BOBO
CHARLES F. MULLINAX
WISTAR W. MACOMSON
ARTHUR H. BATES JR.
By Parrott, Richards and Sims
Attorneys Patented July 21, 1953 2,645,939

UNITED STATES PATENT OFFICE 2,645,939

SHEET MEASURING APPARATUS

Arthur H. Bates, Jr., Dalton, Ga., and Ned Bobo, Charles F. Mullinax, and Wistar W. Macomson, Lyman, S. C., assignors to Pacific Mills, a corporation of Massachusetts Application August 11, 1950, Serial No. 178,862

2 Claims. (Cl. 73—159)

This invention relates to apparatus for measuring a web of sheeting material, which is to be torn into sheets of fixed length, so as to minimize waste of the sheeting when defects occur therein.

To accomplish this purpose heretofore, it has been proposed to draw the sheeting material over a table of great length, having several decks along which the sheeting is drawn, and each of the decks being equipped with a scale for measuring the length of the sheeting and having indicia printed thereon to indicate the number of different standard-length sheets, such as, for example, 99 inch sheets and 108 inch sheets, which will have to be cut or torn from the leading edge of the sheet down to the location of the defect, with the minimum of wastage. This prior proposal is disclosed in T. C. Perry et al. Patent No. 1,933,682, issued November 7, 1933, and T. C. Perry Patent No. 2,091,522, issued August 31, 1937. Although the sheet measuring tables made in accordance with these patents effect an improvement over the systems used prior to the patents in minimizing wastage, they are nevertheless subject to the objection of requiring a long table, for example, a table 23 feet in length, and the use of several decks or ramps in these tables, over which the sheeting must be drawn prior to cutting, and the use of scales coextensive in length with the several decks or ramps of the table.

Furthermore, with all its multiple decks and great length this Perry device is a dapted to accommodate and measure lengths of material up to 33 yards maximum, that being the total length of this table decks plus the additional distance from the outlet end of the table to the reference point on top. While a judicious determination of the standard sizes to be severed from such lengths will result in some saving of material, it is only with lengths in excess of 33 yards that the wastage per defect reaches a minimum. Thus, for lengths of less than 33 yards, and with the two standard sheet sizes of 99 and 108 inches, the wastage per defect may run from 9 inches to 2½ yards, while for lengths greater than 33 yards, the wastage can be maintained uniformly at 9 inches per defect. Since in sheet manufacturing operations, almost all defect-free lengths of material exceed 33 yards, the maximum advantage of such a tearing schedule cannot be realized with the apparatus shown in the prior art.

In accordance with the present invention, the system of these prior Perry patents has been substantially improved by eliminating the long table with its several decks and the scales used thereon. Also, provision is made for measuring lengths in excess of 33 yards, actually, from 0 to 410 yards, with the result that the maximum advantage of the accompanying tearing chart realized and wastage of sheeting material is held to a maximum of 9 inches per defect, for lengths of 33 yards or more.

The objective is more easily and efficiently accomplished pursuant to the present invention by a combination of a direct measuring and registering device to show at all times the length of sheeting web that has been measured, and a chart which is keyed to the measurements on the registering device which indicates to the operator the number of "other" or different length sheets from those which he has been tearing that must be torn to effect minimum wastage, when removing the defective portion of the web. With this new improved system, a table of only 8 to 10 feet long is required and no scales are employed along the length of the table. The above-mentioned chart of the present invention may be mounted at any suitable location near the operator's station at the table. This chart does not measure or even indicate the length of the sheeting that has been drawn across the table, but instead it shows the operator the number of sheets which must be torn to provide a minimum of wastage in removing the defect, for any given yardage shown on the registering device which is located conveniently to the operator.

The severing of sheets from a longer web is generally accomplished by tearing, since this severs the web along a single filling thread and thereby produces a straight edge. This method is also used because of its convenience. It is to be understood, however, that the sheets can be severed by any other convenient method, such as by the use of scissors or other mechanical cutting devices.

In a practical embodiment of this invention, the sheeting web is measured and registered through the instrumentality of two Selsyn motors, one of which is connected to a drum over which the sheeting material is initially drawn and thereby actuates rotation of the drum and the shaft of the Selsyn motor, and the other Selsyn motor is electrically connected to this first motor and actuates the registering device or motor which measures in yards the sheeting web that is drawn over the above-mentioned rotated drum. This rotated drum with connected Selsyn motor, and the supply roll of sheeting web, are normally located at one end of the table, and the other Selsyn motor and recording meter are located near the center of the table where the operator stands for tearing the sheets. It will be understood that these two Selsyn motors might be arranged in some other manner, and also that they might be substituted by a mechanical arrangement for driving the registering meter in accordance with the rotations of the drum, and which arrangement might comprise either a flexible cable or even a fixed, direct drive from the drum to the registering meter.

The chart which constitutes the companion piece of equipment to the recording meter and its actuating mechanisms, is prepared so as to inform the operator of the number of different length sheets to be torn, when a seam or defect occurs, and has an unlimited range. In actual practice a range of zero to approximately 400 yards has been found adequate. Also, the chart provides under each consecutive number of yards, subdivisions into quarter yards, and the number of 99-inch sheets or 108-inch sheets that should be torn at each yardage measurement on the recording meter to minimize waste in removing a defect.

The defect detecting device which is used in accordance with this invention is normally located at one end of the table adjacent the yardage drum. This detection device is so arranged and connected with the source of power used for advancing the web, that the mechanism will automatically stop when a defect reaches the detection device. At this point, the operator refers to the yardage meter to determine the number of yards of web that have been fed over the yardage drum since the beginning of his current operation, and then refers to the chart, which shows him very quickly the number of "other" or different length sheets from the length which he has been tearing, which must be torn with a minimum of waste for him to reach the defect that has just been discovered by the defect detection device. This defect may in actual practice be something like 25 to 125 yards back of the leading edge, that is, the last torn edge of the web. It will be understood from the more detailed description to follow that this accumulation of web yardage is located on the table, in the scray and over the yardage drum, which come prior to the operator's position.

A more complete understanding of the invention will be had by reference to the following detailed description taken in conjunction with the accompanying drawings in which:

Figs. 3, 4, 5 and 6 are consecutive sheets of a chart bearing indicia keyed to yardage measurements up to 410 yards and indicating for each of two standard sheet lengths the number of sheets of the other size that must be severed from the measured web in order to result in minimum wastage of material in removing a defect from the web.

Figure 1:
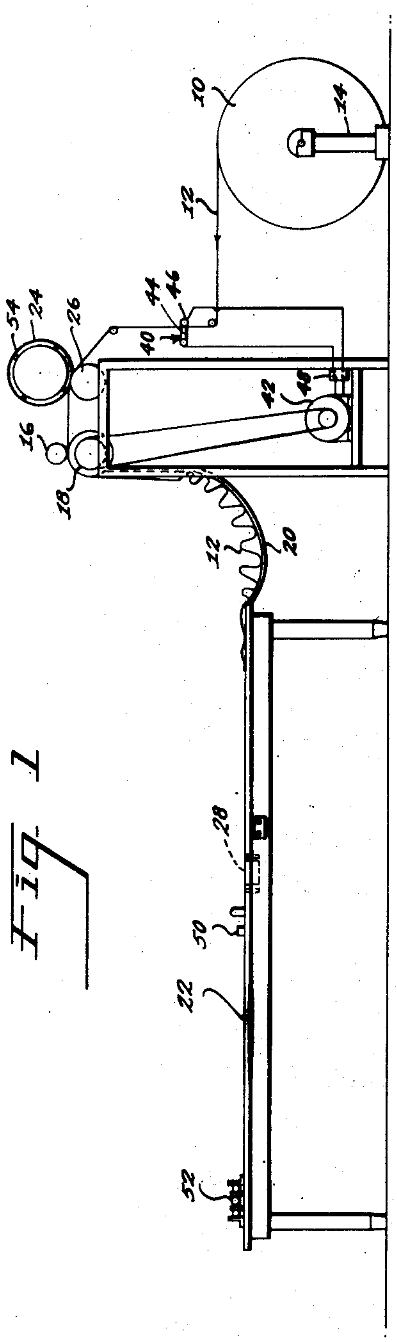
Fig. 1 is a side elevation of a sheet measuring and tearing apparatus embodying the means for minimizing wastage of material in accordance with the present invention.

Referring now in detail to the drawings and in particular at first to Fig. 1, a roller 10 of sheeting web 12 in which the defects have been located and marked and which has been folded twice and rolled into what is known as a "double-doubled" roll, is mounted on supports 14, from which it is withdrawn by nip rollers 16 and 18 and fed into scray 20. The web 12 is drawn from scray 20 onto an adjacent table 22 where it is measured and severed into the desired standard sheet lengths.

Rotatably supported adjacent the web 12, between roller 10 and nip rollers 16 and 18, is a yardage drum 24 and an operatively associated pressure roller 26, between which web 12 is drawn and which are adapted to be rotated by the moving web 12. Yardage drum 24 is operatively associated with a registering means 28, for indicating the length of web that passes over drum 24 and which may be conveniently located on table 22. This operative association between yardage drum 24 and registering means 28 may conveniently comprise a Selsyn motor 30 mounted on the shaft of yardage drum 24 which has an electrical connection by means of wires 32 with a second Selsyn motor 34 adapted to actuate the registering means, such as yardage meter 28, by such means as a chain drive 36. A reset device 38 is provided so that registering means 28 can be set on "0" at the beginning of each operation.

Disposed adjacent the moving web 12 between roll 10 and nip rollers 16 and 18, is a defect-detection mechanism 40 which is adapted, when a defect in the web appears, to interrupt the power to motor 42 which drives nip rollers 16 and 18. Since the usual method of marking defects is to remove a generally circular swatch of material from web 12 at a point approximately 6″ from the selvage edge which will form the outer fold of the "double-doubled" web as it is unwound, this device may conveniently comprise a pair of electrical contact members 44 and 46 which are normally held apart by the outer fold, which passes between said contact members. When a break in the web, such as a defect in marking hole, occurs in web 12, contact members 44 and 46 come together to complete an appropriate electrical circuit and actuate a stop mechanism 48, thereby interrupting the flow of power to motor 42.

As the web 12 is fed into the scray 20 at one end by nip rollers 16 and 18, it is withdrawn from the opposite end onto table 22 for measuring and severing into the desired standard lengths. A convenient and accurate method for doing this is that described in our copending application Serial No. 178,861 filed August 11, 1950, for a sheet marking apparatus. This apparatus includes a cutting blade 50 which serves as a reference point and a doubling bar 52 which is adjustable to at least two appropriate positions with respect to its distance from reference point 50, so that the sheeting web 12 may be drawn around doubling bar 52 and doubled back to reference point 50 to indicate the exact point at which the web 12 should be severed to form a sheet of the desired length. As an aid in providing the rapid and accurate measurement of standard sheet lengths, visible marks may be conveniently applied to the web at appropriate intervals, preferably 9 inches apart, by means of marking tips 54 which project from the periphery of the yardage drum 24, and which impress on the web 12 at regular intervals a characteristic mark, such as an annular indentation.

By accurately measuring each sheet severed from web 12 to uniform size, we are able to determine for a given length of defect-free material and a desired standard sheet length, the number of sheets of a different standard length that must be severed from the web in order that the wastage in removing the defect be held to a minimum, 9 inches.

Figure 2:
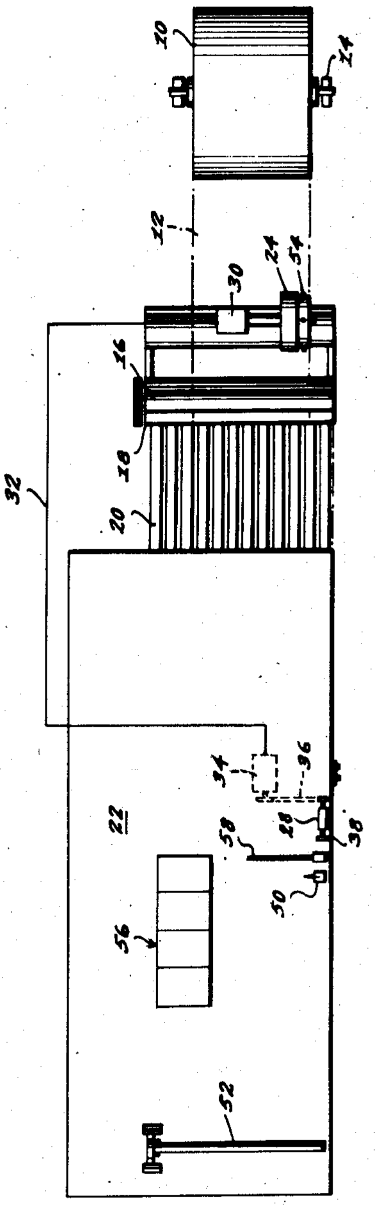
Fig. 2 is a plan view of the machine shown in Fig. 1.
Figure 3:
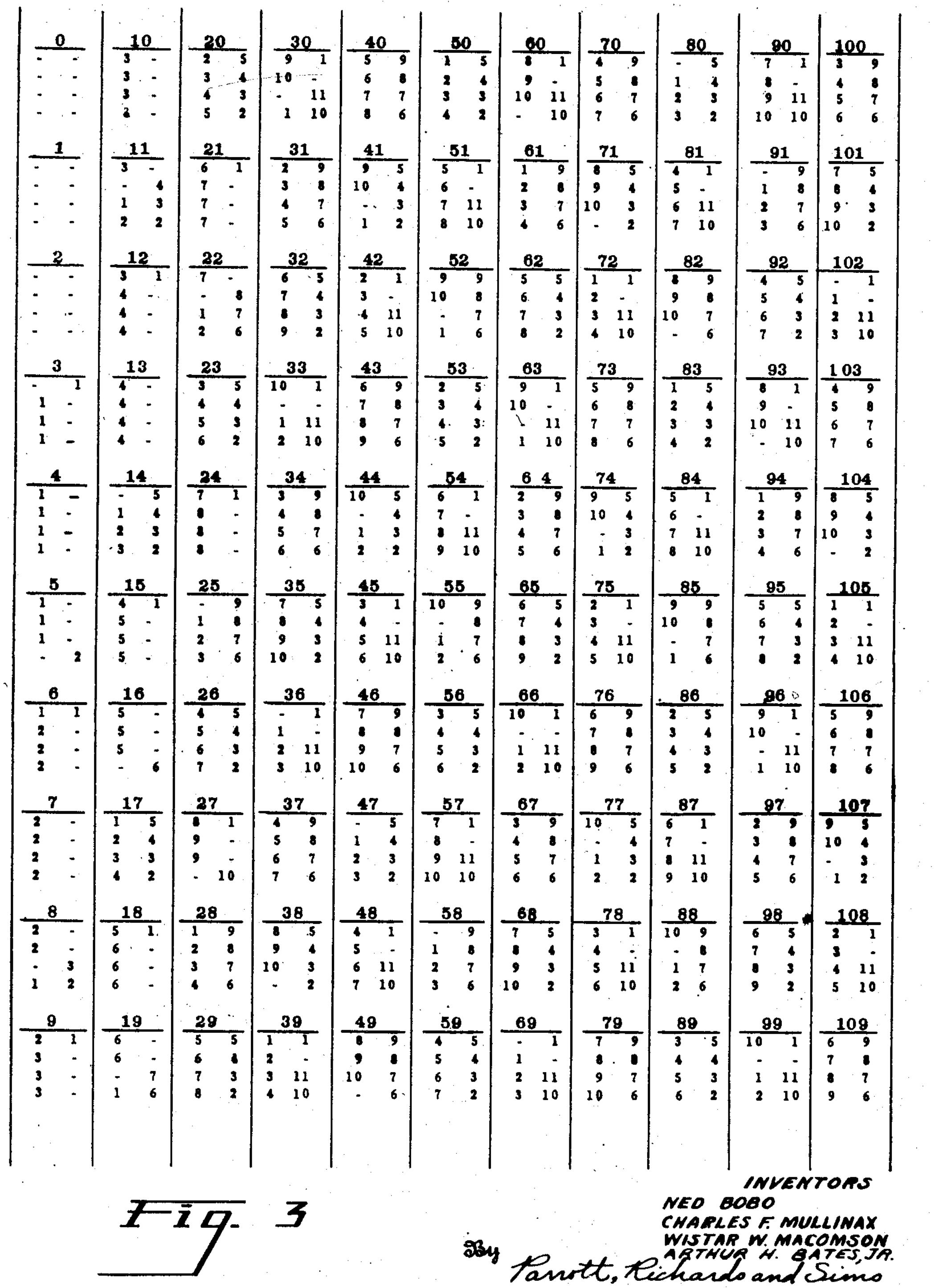

We have prepared a chart 56, which should be located conveniently near the reference point 50 (see Fig. 2) so that it can be readily consulted by the operator from his position by table 22.

In using the device and method of this invention, the operator stands by the measuring table 22 near yardage meter 28 and draws the advance edge of marked web 12 across table 22 past reference point 50 around doubling bar 52 and back to the reference point 50. The mark in the web 12, which lies even with the advance edge of web 12 at the reference point 50, indicates the point at which the material should be severed. Web 12 is ordinarily severed by cutting a nick at the center fold and then tearing it since this method insures straight seams. A separating bar 58 extends between the center fold and the two outer folds of "double-doubled" web 12 to facilitate grasping of the center fold for slitting.

As the web 12 is drawn from roll 10, the operator measures and tears sheets of a desired standard length until the appearance of a defect at the detection device 40 actuates a stop mechanism 48 to stop the withdrawal of web 12 by nip rollers 16 and 18. At the time the machine is stopped in this manner, a considerable portion of defect-free web is still in the machine between defect-detection device 40 and the reference point 50. The exact length of the entire defect-free portion of web 12 that has been drawn across yardage drum 24 is indicated by yardage meter 28. The operator consults the tearing chart (see Figs. 3, 4, 5 and 6), to determine the number of "odd-size" sheets that must be torn from the remaining defect-free portion in order that the wastage of sheeting be held to a minimum. The term "odd-size" is used to describe a standard length other than the one being torn at the time the machine is stopped. For example, if the desired sheet length is 108 inches, a 99 inch sheet is considered to be an "odd-size," whereas a 108 inch sheet is considered to be an "odd-size" if the desired size is 99 inches.

The tearing chart, shown generally at 56 (see Fig. 2), is disposed in a position that permits ready consultation by the operator, such as on the top of the tearing table 22 adjacent the blade 50. This chart, which is shown in detail in Figs. 3, 4, 5 and 6, is made up of a number of vertical columns, each column being divided into ten consecutively numbered subdivisions. The subdivisions of the columns on the extreme left hand side of the chart (see Fig. 3), are numbered from 0 to 9, while those of the second column are numbered from 10 to 19, those of the third column from 20 to 29, etc. The numbers apply to the measurement of the web in even yards. Each subdivision has two parallel columns of four numbers each. The first number of each column applies to the even yardage represented by the number at the top of the particular subdivision, while second, third and fourth numbers apply to the fractional portions one-fourth, one-half and three-fourths yards, respectively. For example, in Fig. 3, the vertical column headed by the number 50 contains subdivisions 50 through 59. Under the subdivision 53, the first horizonal row contains the numbers 2 and 5, which numbers apply to 53 yards even. The numbers 3 and 4 in the second horizontal rows from the top apply to 53¼ yards, while the numbers 4 and 3 in the third row apply to 53½ yards and numbers 5 and 2 in the fourth row apply to 53¾ yards.

This chart 56 is made up for use in tearing either 99 inch or 108 inch lengths. The two columns of figures within each subdivision indicate the number of sheets of a certain size that must be torn from a defect-free portion of sheeting in order that wastage be held to a minimum. The numbers in the left hand column of each subdivision indicate the number of 108 inch lengths that must be torn when the desired length is 99 inches, while the numbers in the right hand column indicate the number of 99 inch lengths that must be torn when the desired length is 108 inches.

The following are illustrative examples of the proper manner of using the chart in actual operations:

*Example 1*

If the length of the defect-free materials is 53½ yards, in the subdivision headed by number 53, the numbers 4 and 3 appear in the left and right hand columns, respectively. This means that three sheets of 99 inch length should be torn from the web if the desired length is 108 inches, while 4 sheets of 108 inch length should be torn if the desired length is 99 inches. The numbers in this chart are determined so that the last traverse tear across the web will be made at the last 9 inch mark before the defect is reached.

To check:

3@99" = 8¼ yds.
15@108"=45 yds.
Wastage= ¼ yd.
Total =53½ yds.

Or

4@108" =12 yds.
15@99" =41¼ yds.
Wastage= ¼ yd.
Total =53½ yds.

*Example 2*

Assume that the operator is tearing sheets of 99 inch length and at the time the machine is stopped by the occurrence of a defect, the yardage meter indicates that a total length of 142¼ yards has been measured since the previous defect occurred. The operator looks under the subdivision headed by 142, which is found in the fourth column from the left of Fig. 4. In the right hand column, the second number from the top is 7. This indicates that the operator must tear 7 sheets of 108 inch length from the remaining portion of the defect-free web. Since it is not known how much cloth is in the machine, the preferred practice is to set the doubling bar 52 in the 108 inch position, zero the yardage meter, reset the stop mechanism, start the machine and tear 7 sheets of 108 inch length. Immediately after this, the doubling bar 52 is reset to the 99 inch position and the tearing of 99 inch sheets is resumed. When the defect reaches the cutting table, the last full length sheet will be severed from the web at the mark just preceding the defect. The operator then makes a transverse tear at the mark just following the defect and the portion containing the defect is discarded. Thus, the wastage of material is held to a maximum of 9 inches for each defect.

To check:

7@108" =21 yds.
44@99" =121 yds.
Wastage=¼ yd.
Total =142¼ yds.

*Example 3*

Assuming that the operator is tearing 108 inch sheets and the yardage meter indicates that the distance between defects is 320½ yards, the number of 99 inch sheets that should be severed from the web is found in the extreme right hand column in Fig. 5, under the subdivision headed 320. In the left hand column of the subdivision headed by the numer 320, the third figure from the top is the number 3. Therefore, three 99 inch sheets should be torn from the remaining defect-free portion.

To check:

| | |
|---|---|
| 3@99'' | =8¼ yds. |
| 104@108'' | =312 yds. |
| Wastage | =¼ yd. |
| Total | =320½ yds. |

*Example 4*

As a final example, assume that the tearing schedule calls for 108 inch sheets and at the time the defect appears, the yardage meter reads 400 yards. Subdivision number 400 occurs in Fig. 6 at the top of the column on the extreme right. The upper number in the right hand column of this particular subdivision is 9, which means that 9 sheets of 99 inch length should be severed from the web and any remaining portion should be severed into 108 inch lengths.

To check:

| | |
|---|---|
| 9@99'' | =24¾ yds. |
| 125@108'' | =375 yds. |
| Wastage | =¼ yd. |
| Total | =400 yds. |

Since sheets are ordinarily of either 99 inch length or 108 inch length, those "odd-size" ones that are torn to maintain a low wastage of material do not create a problem because they can be used in filling other orders.

It is obvious that this invention is not limited to the formation of bed sheets, but may, by appropriate modification, be used in the formation of other items, such as table covers, pillow cases, curtains, etc., which are severed in uniform lengths from a longer web of material.

The specific details and examples have been given for the purpose of facilitating an understanding of the invention and not with any limiting intent, the scope of the invention being defined by the following claims.

We claim:

1. In a sheet tearing apparatus of the type described incorporating a table across which a web of sheeting material is drawn for successive measurement and tearing of sheets therefrom, a web defect detecting mechanism disposed in relation to said web ahead of said table, a marking and measuring wheel rotatably disposed ahead of said table adjacent said detecting mechanism, a rotatable pressure roll disposed in opposed relation to said marking and measuring wheel to form a nip therewith whereby said wheel is rotated by the travel of said web of sheeting material as it is advanced to be drawn across said table, marking tips radially disposed about the periphery of said wheel with a regular spacing corresponding to the greatest common factor of standard sheet lengths to be torn from said web whereby non-staining removable mearkings are embossed at regular intervals in said web corresponding to the spacing of said marking tips, and a resettable registering device disposed on said table and actuated from the rotation of said marking and measuring wheel for indicating the length of said web advanced to said table from the last defect detected by said detecting mechanism.

2. In a sheet tearing apparatus of the type described incorporating a table across which a web of sheeting material is drawn for successive measurement and tearing of sheets therefrom, a web defect detecting mechanism disposed in relation to said web ahead of said table, a marking and measuring wheel rotatably disposed ahead of said table adjacent said detecting mechanism, a rotatable pressure roll disposed in opposed relation to said marking and measuring wheel to form a nip therewith, whereby said wheel is rotated by the travel of said web of sheeting material as it is advanced to be drawn across said table, marking tips radially disposed about the periphery of said wheel with a regular spacing corresponding to the greatest common factor of standard sheet lengths to be torn from said web, whereby non-staining removable markings are embossed at regular intervals in said web corresponding to the spacing of said marking tips, and means actuated from the rotation of said marking and measuring wheel for indicating the length of said web advanced to said table from the last defect detected by said detecting mechanism.

ARTHUR H. BATES, Jr.
NED BOBO.
CHARLES F. MULLINAX.
WISTAR W. MACOMSON.

References Cited in the file of this patent

UNITED STATES PATENTS

| Number | Name | Date |
|---|---|---|
| 2,091,522 | Perry | Aug. 31, 1937 |
| 2,393,631 | Harrison et al. | Jan. 29, 1946 |

FOREIGN PATENTS

| Number | Country | Date |
|---|---|---|
| 546,480 | Great Britain | July 15, 1942 |